Figure 1:
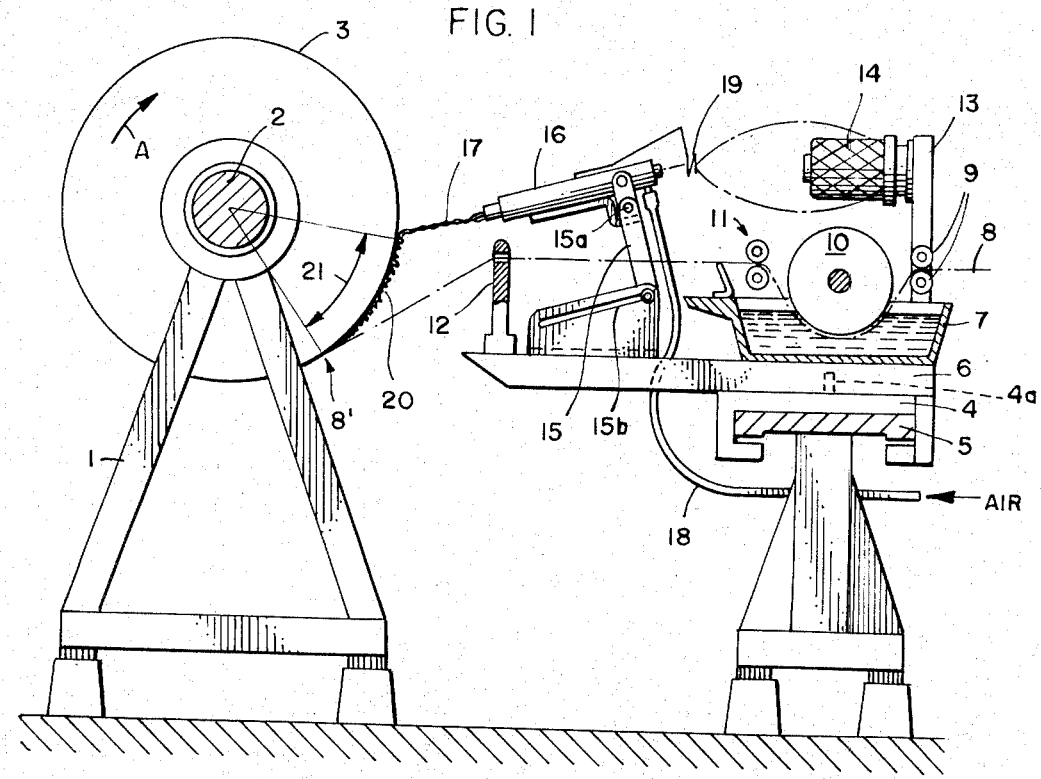

United States Patent [19]
Muller

[11] 3,784,429
[45] Jan. 8, 1974

[54] METHOD FOR PRODUCING ROTATIONALLY SYMMETRICAL GLASS FIBER REINFORCED LAMINATED HOLLOW STRUCTURES

[75] Inventor: Manfred Muller, Wuppertal-Barmen, Germany

[73] Assignee: Akzona Incorporated, Asheville, N.C.

[22] Filed: July 22, 1971

[21] Appl. No.: 165,127

[30] Foreign Application Priority Data
July 23, 1970  Germany.....................P 20 36 513.3

[52] U.S. Cl............... 156/175, 156/180, 156/429, 156/430, 156/446
[51] Int. Cl............................................B65h 81/00
[58] Field of Search........... 156/161, 162, 169–173, 156/175, 184, 185–188, 190, 192, 195, 429, 430, 446

[56] References Cited
UNITED STATES PATENTS
3,412,891  11/1968  Bastone et al................. 156/171 X
3,410,741  11/1968  Barnet............................. 156/173
3,449,188  6/1969  Huff............................... 156/429 X Primary Examiner—William A. Powell
Attorney—Johnston, Root, O'Keeffe, Keil, Thompson & Shurtleff

[57] ABSTRACT

Method and apparatus for producing laminated hollow structures having at least one glass fiber reinforced resinous layer wherein there are simultaneously applied to a winding core or rotationally symmetrical form (a) a filamentary fleece or web of a fibrous organic polymer such as continuous polyester filaments, and (b) a winding layer of glass fiber roving or rovings impregnated with a curable thermosetting synthetic resin such as unsaturated polyester resins or epoxy resins. The apparatus includes, in addition to means for wrapping the roving or rovings of glass fibers, a blowing nozzle means for the continuous deposition of the fibrous fleece or web at a displaced angle with reference to the winding application of the glass fiber roving material. The products of the invention are useful as storage vessels, pipes, tubes, cylinders, fittings and the like, e.g. as frequently required in the petrochemical industry.

8 Claims, 2 Drawing Figures

INVENTOR:
MANFRED MÜLLER

METHOD FOR PRODUCING ROTATIONALLY SYMMETRICAL GLASS FIBER REINFORCED LAMINATED HOLLOW STRUCTURES

This invention generally relates to a process for the production of rotationally symmetrical hollow bodies or tubular structures of all types, especially laminated liquid storage vessels of glass fiber reinforced resins wherein the composite structure contains at least on one surface a fleece or web or organic synthetic filamentary material saturated with synthetic resin as a buffer or highly inert layer and also at least one layer of continuous glass filaments. The invention also provides a combination of apparatus for carrying out the desired process.

It is a known practice to make containers, vessels, pipes and chemical apparatus of a glass fiber reinforced, unsaturated polyester resin or epoxy resin by a winding process followed by curing of the resin. The winding of the container, pipe or like apparatus takes place on a winding core or form rotatable about its longitudinal axis in such a way that rovings of continuous glass fibers, as defined in the German Industrial Standards, DIN Draft 60 001 sheet 2, Textile Fiber Materials, Fiber Forms, of January 1970, ribbons, sheets, bands, yarns or the like of several rovings of continuous glass filaments, which have been conducted through an impregnating bath of the synthetic resin, are wound spirally onto the rotating core. In this process the individual windings of the roving or rovings within the same winding layer lie at a more or less large axial distance from one another. Then, in opposite direction, a second winding layer is applied with the same pitch angle or braiding angle in such a way that the windings of the superimposed roving layers cross each other, i.e. in a so-called braided pattern. The process is repeated until there is produced a closed or hollow body having the requisite wall thickness. For the simultaneous production of container covers or bottoms, which need not be explained in great detail here, there are known various additional devices, mostly program-controlled, for such winding machines.

The synthetic resin used for the impregnating bath is ordinarily mixed at an appropriate point with a suitable hardener and catalyst or cross-linking agent according to the instructions of the resin manufacturer, so that it is cured or cross-linked, preferably during the production of the hollow structure even at room temperature, i.e., without using elevated temperatures or pressures.

The glass fiber mats and rovings of continuous glass filaments used in combination with curable synthetic resins are essentially adapted to the reinforcing of structural parts, since with sufficient adherence to the hardened or cured resin, it is well known that they strongly improve or increase the mechanical properties and the strength characteristics of the resulting glass fiber laminate. On the other hand, the corrosion-resistance or similar properties of the composite material of the glass fiber material and its reinforced member are also influenced. The continuous glass filaments or staple glass fibers (for glass fiber mats) are usually stable and chemically inert, with respect to many known liquids and chemicals. However, it was found that a monofilament with a diameter of approximately 5 to 13 microns ($\mu$) is gradually completely dissolved by water or steam as a consequence of hydrolytic disintegration. This generally permits a corrosion and slow destruction wherever continuous glass filaments or staple glass fibers are unprotected or accidentally come in contact with water, water vapor (for example from the air) or a corresponding corrosive medium, whether such contact is a result of pores or other surface defects caused by faulty manufacture (for example, air bubbles which are included in the resin at the inner surface of the container) or by improper handling in operation of the formed body (for example, by scratching the surface with mechanical cleaning instruments or during installation which requires subsequent drillings, etc.) or by abrasion (for example, in pipe lines or other conduits). The slow disintegration of the continuous glass filaments or staple glass fibers in the composite structure is always accompanied by another phenomenon that is dangerous especially with pressure containers, namely the releasing or separating of the adhesive size or finish which is initially applied to the rovings for the improvement of adhesion between the resin and glass fibers or filaments. Penetrating water or moisture along the individual glass filaments or fibers causes this disruption of adhesion, whereby the strength of the glass fiber reinforced laminate is considerably diminished.

By reason of these very negative influences on the corrosion behavior of the composite material, especially where there is a glass fiber reinforced surface layer which remains largely unprotected, there has more recently been a shift to the more successful practice of using a modified laminated structure in the production of glass fiber reinforced storage containers and particularly underground storage vessels. Various liquids endangering ground water must frequently be stored in this manner, for example heating oils, mineral oil or other petroleum products, as well as various fluid products with respect to which the thermosetting resins such as unsaturated polyester resins or epoxy resins are chemically stable. These stored fluids may also contain traces of water or else stored or transported fluids may be in the form of aqueous compositions which in themselves can damage or corrode the glass fiber reinforced inner layer or surface of the hollow structure.

In order to overcome such problems, there is first wound by hand onto the winding core coated with liquid resin a fleece web separately produced, usually chemically or thermally bonded, of polyester continuous filaments or polyester staple fibers. The polyester fleece or web, when impregnated with a synthetic resin, is insensitive to moisture and serves as a support for the bands or windings of rovings of continuous glass filaments also soaked in the liquid resin and often pretreated with adhesive finishes. The initially wrapped web of synthetic organic filaments of fibers, e.g. a fibrous polyester, simultaneously acts as a chemically stable, buffer layer between the synthetic resin on the exposed surface and the continuous glass filaments appearing radially inwardly in the laminate structure, i.e. inwardly of the outer exposed surface.

The usual process for the production of vessels, pipes or the like of glass fiber reinforced resins which contain in their laminated structure at least one synthetic organic fibrous polymer fleece layer saturated with a thermosetting synthetic resin and at least one resin layer of continuous glass filaments preferably makes use of the machines typical for that winding process in which the glass fiber reinforced layer or layers can be wound as a roving or rovings in the manner described with circumferential velocities of the winding core or form of 60 meters/minute or higher. The process has the disadvantage, however, that the fleece webs composed of polyester fibers or the like have a width from about 100 to 400 mm. and weights per unit of surface area of about 20 to 40 grams per square meter (g/m$^2$) and must be chemically or thermally bonded before their application. Also, they must be wound manually on the mandrel or spindle while turning the core or form in the winding process only very slowly. On the inner and on the outer surface of the vessel or other hollow body, this winding has to be accomplished with very special care so that the intended protection for the continuous glass filaments is achieved and faults or porous openings or places are avoided. The prefabricated fleece webs must be wound around the core or form with an overlapping width of about 10 to 22 mm., depending on the size of the vessel and the normal width of the fleece.

One object of the invention is to improve the process for producing glass fiber reinforced liquid or fluid pipes, tubes, storage vessels, containers or the like with the described laminated type of structure and to accomplish this production in much shorter periods of time, particularly by achieving a better utilization of the winding apparatus and omitting the prefabrication of the fleece or web of polyester filaments or other equivalent synthetic polymer fibrous material. Other objects and advantages of the invention will become more apparent upon consideration of the following detailed specification.

It has now been found in accordance with the invention that a highly water-resistant, laminated hollow structure having at least one glass fiber reinforced layer can be advantageously produced in a method which includes the steps of continuously rotating a winding core at a speed adapted to receive at least one glass fiber roving in winding engagement therewith, and simultaneously applying to the rotating core, at a small angle of displacement from each other on the circumference of the core, at least the following two layers in any sequence (a) a random, non-woven, filamentary fleece which is deposited as a dry, airlaid, synthetic, water-resistant fibrous material onto the core circumference containing a preapplied liquid thermosetting resin, and (b) a band of at least one glass fiber roving impregnated with a liquid thermosetting resin and continuously wound under tension onto said core circumference.

Suitable apparatus for carrying out the simultaneous filament winding and fleece laying process or method of the invention generally includes a conventional filament winding machine having drive means to turn the winding core or so-called mandrel, distributing means for the programmed winding of at least one fiberglass roving onto the core member in a selected pattern over its axial length and also means to impregnate the roving with a liquid thermosetting resin for wet-winding. The present invention essentially resides in the combination of nozzle means coupled with the distribution means of the filament winding machine for the purpose of airlaying continuous synthetic filaments as a random fleece or web onto the core member in the same selected pattern but with the air laid filaments being directed onto the core surface at a small displaced angle from the winding line of the roving on the circumference of the core.

The method and apparatus of the invention generally follows the known principles of filament winding machines insofar as it is both necessary and desirable to wet-wind a band of one or more fiberglass rovings onto a rotatable core or mandrel, i.e. a helical winding machine capable of applying one or more layers of glass filaments onto the core. Such machines have been described in considerable detail in the prior art, and attention is therefore directed to such standard texts as "Handbook of Fiberglass and Advanced Plastics Composites", edited by George Lubin, Van Nostrand Reinhold Company, New York (1969), particularly Chapter 18, all of which is incorporated herein by reference. This same text also provides a very detailed disclosure of available fiberglass materials and finishes for use in filament winding as well as the most suitable thermosetting resins and their curing agents. All of these features are adopted herein with respect to the wet-winding of the fiberglass roving material onto the turning core, including the use of special distribution means for enclosing the ends of a hollow structure, e.g. to provide a bottom and/or top on large storage vessels or the like.

Figure 2:
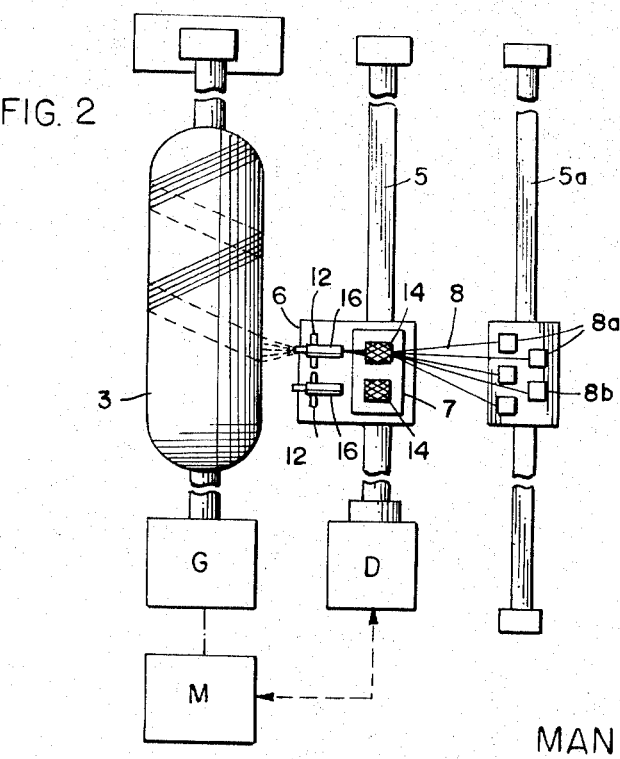

The invention is further explained with the help of the accompanying drawing which merely illustrates one embodiment of the invention in a somewhat simplified form, there being many variations or other embodiments of filament winding machines capable of being adapted and combined with the particular airlaying and fleece-forming means of the present invention. In the drawing:

FIG. 1 is a side elevational view of an embodiment of the apparatus according to the invention, some portions being omitted or shown only in a schematic form; and FIG. 2 is a schematic top plan view of essentially the same apparatus as that shown in FIG. 1.

The present invention is primarily concerned with the development of the above described methods or processes of producing rotationally-symmetrical hollow bodies, whereby the continuous formation or generation of a protective fleece or web layer and the winding of the core or mandrel of the hollow body with a band of resin-impregnated fiberglass roving or rovings be carried out simultaneously on the same winding machine normally used for filament winding alone. In the production of the fleece or nonwoven web of synthetic filaments, it is possible to proceed in a preferred manner such that the fleece or web is generated by blowing at least one substantially untwisted multifilament yarn drawn off from a supply bobbin, by means of compressed air through one or more conventional airlaying or jet nozzles onto a core or winding surface containing the fresh or preapplied liquid resin, and also such that the individual fleece or web is made as a band which is somewhat wider than the wound fiberglass band simultaneously being applied as one or several rovings of continuous glass filaments, the two different "bands" being applied with a certain lead or lag angle representing their circumferential angle of displacement. This angle between the generated fleece or web band and the fiberglass roving band is preferably brought about according to the process of the invention by conveying the untwisted continuous filament yarn with the air stream furnished by the jet nozzle and resolved by this into its individual filaments so as to be deposited randomly and loosely but in a generally axial parallel line on the fresh resin-coated surface of the core with the formation of a dense fleece or nonwoven web, while the roving bands are wound under tension onto the rotating winding core at a short distance in front of or behind the axial line of application of the fleece or web.

In Both FIGS. 1 and 2, there is schematically represented the combination of apparatus which has been found most useful for the execution of the preferred process of the invention.

The filament winding machine itself includes the machine stand or frame 1 with the spindle or axles 2 as a bearing for the winding core or mandrel 3 and a distributing means comprising the slide or shifting member 4 drivable over a guide rail 5 or the like, which in combination with the attache table 6 is movable back and forth as a shuttle or reciprocating feed carriage with respect to the axially fixed winding mandrel, this reciprocating carriage movement being parallel to the longitudinal core or mandrel axis. The winding core or mandrel 3 is driven by a suitable drive motor M (see FIG. 2) over an infinitely regulable gear means such as gear box G, and or other means such as belt drives or the like (not illustrated) for the necessary transmission of forces and torques at the desired turning rate, for example, in the direction of arrow A.

The advance or reciprocating movement of the distributing slide member 4 operating the feed carriage can be established by conventional drive and control means D to conform to the desired turning rate of the core 3 and provide the desired winding pattern, e.g. at a particular helical angle. On the table 6 of the feed carriage, there is secured an impregnating tank 7 filled with the liquid thermosetting synthetic resin, through which the fiberglass roving or the band 8 formed of several fiberglass rovings is conducted. The individual plied rovings as yarns are preferably drawn off from supply bobbins 8a arranged on a bobbin holder or creel 8b, and supplied by suitable yarn guides to a first roller pair 9. This bobbin creel can also be shifted on its own slide rail or track 5a along with the advance or reciprocating movement of table 6. From the rollers 9, the band of fiberglass rovings is guided about the freely turnable impregnating roller 10 and drawn through the liquid resin bath to the roller pair 11, where excess impregnating resin is stripped off.

Under the winding tension of the driven core or mandrel 3, the roving band 8, conducted by the guide element 12, is then helically wound in a single- or multi-circuit pattern. For the modification of the run-on direction of the roving band 8 onto the core 3, the table 6 is preferably pivotally mounted on the slide element 4, e.g. so as to swing horizontally on pin 4a.

The table 6 of the distributing means or feed carriage also carries one or more bobbin holders 13 for the reception of yarn bobbins 14. For example, at least one bobbin holder can be provided for a bobbin or feed spool of a synthetic thermoplastic continuous filament yarn and then a further bobbin holder may also be provided for a bobbin or feed spool of continuous glass fibers or filaments. Such yarns or bundles of continuous filaments, which are of substantially zero twist, can be fed individually or together in various combinations to form the desired fleece layer.

On that part of the table 6 facing the core 3, there are mounted on brackets 15 the jet nozzles 16 for the blowing or air-laying of the continuous multifilament yarns 17. The jet nozzles are pivotally and adjustably secured to the brackets 15, e.g. at 15a, in such a manner that their angle of inclination with reference to the depositing surface or zone of the air-laid filaments on the core 3 can be varied. Also, the spacing between the nozzle outlet and the core-surface is preferably adjustable, for example by a sliding adjustment of the brackets 15 in the slot 15b of a supporting base member. The number of jet or air-laying nozzles 16 on the table 6 of the distributing means preferably corresponds to the number of yarn bobbins 14 being used. The compressed air required for the blowing of the continuous filaments 17 is supplied to the nozzles 16 through flexible conduits or tubes 18 from a compressed air generator (not shown).

The initially untwisted yarn 17 is thus drawn off overhead from the yarn bobbin 14 and supplied over the yarn guide 19 to the jet nozzle 16. By means of the air stream emerging at a high velocity from the jet nozzle, the yarn is resolved into individual filaments which are conveyed to the core surface where they are deposited on the liquid and still sticky synthetic thermosetting resin in the form of a spiral band of fleece or a relatively densely formed nonwoven web 20. This web is overwound by the roving band being applied under tension with the lag angle 21.

Especially recommended as synthetic thermosetting resins or liquid curable resinous compositions are unsaturated polyester resins and epoxy resins mixed with a suitable hardener and accelerator, e.g. particularly those compositions which harden or are crosslinked at room temperature so as to be most suitable for the production of the hollow article in a continuous process. These resins are described in considerable detail in Chapters 2 and 3 of the above noted "Handbook" by George Lubin, together with the most appropriate catalysts and accelerators for the unsaturated polyesters as well as many useful hardeners or so-called curing agents, activators or catalysts, usually of the amine or acid anhydride type. See especially pages 76–84 of this reference.

For the production of the fleece or nonwoven web according to the process of the invention, it is advisable to use an untwisted and suitably stretched or drawn synthetic yarn composed of continuous filaments, preferably polyester filaments such as polyethylene terephthalate or the like. These polyesters, because of their chemical similarity, have good adhesion properties for the thermosetting resin and likewise have good abrasion- and corrosion-resistance properties. By selecting such filaments, no additional chemical binders are necessary for the bonding of the fleece which is deposited with some force and in dense form by the air-laying on the still sticky or tacky and sill uncrosslinked fresh layer of the liquid synthetic thermosetting resin. The adhesion of the randomly applied web of continuous filaments to the fresh resin surface is sufficiently good and the impregnation of the fleece or web is favored by the fact that it is immediately pressed under tension by the fiberglass band of rovings soaked with fresh resin into additional resin which can be spread on the core or mandrel in a preliminary or practically simultaneous continuous step. This coating of the initial core serving as a rotationally symmetrical form with the curable or hardenable liquid resin is necessary only where the fleece reinforced layer is on the inside of the hollow body and can naturally be omitted when the fleece is applied as an overlayer onto a wet-wound fiberglass layer which contains sufficient liquid resin itself to hold the air-laid synthetic filaments, as a coherent nonwoven web. Where the outer surface of the hollow structure is to be reinforced with this fleece or web, it can be further wrapped or wound temporarily with any suitable non-adherent film so as to achieve a smooth and uniform layer. These and other minor modifications will be readily apparent to those skilled in this art. For the production of the air-laid fleece, for example, there can also be successfully used continuous glass filaments prepared with suitable adhesion finishes or so-called coupling agents on the fiber surface.

The fleece of synthetic filaments is preferably generated on the liquid core of the hollow structure coated with liquid synthetic resin for the formation of a chemically-resistant and moisture-proof inside surface impregnated with resin. It is equally possible, however, to generate the fleece on the core or hollow wall reinforced with several bands or layers of one or more fiberglass rovings in the manner noted above. This chemically-resistant and moisture-proof outer surface layer is generally required for fiberglass-reinforced plastic containers or vessels stored underground, e.g. to hold organic liquids or even gases in a highly leakproof storage tank.

The process of the invention is not restricted solely to the production of a fleece or web for the inner or outer surfaces of containers, which are preferably reinforced only with untwisted polyester continuous filament yarns, or to the simultaneous winding of fiberglass rovings as a single layer in combination therewith, but the invention is also suited for producing a fleece or web of air-laid continuous glass filaments pretreated with suitable adhesive finish or coupling agent to provide additional layers between the roving layers according to the specific requirements of the final laminate structure.

The advantages of the process of the invention for producing laminated fiberglass reinforced hollow bodies, which contain at least one reinforcing fleece of synthetic organic filamentary material as a buffer layer as well as at least one fiberglass reinforced layer, resides in the fact that the generation and air-laying application of the fleece onto the core coated with resin, on the one hand, and the simultaneous winding of the band of several fiberglass rovings can take place at a constant high working speed and the time previously required for the careful manual winding of the nonwoven fleece or web is saved, thereby greatly increasing the utilization of the conventional winding machines. Furthermore, one can eliminate the conventional prefabrication and preparation of a nonwoven fleece or web on separate apparatus, while also avoiding the chemicals for the bonding of the fleece or web. Packing, transporation and storage to and at the point of the processors are likewise avoided. Moreover, the material handling is facilitated and the storage costs considerably reduced through the fact that now only spools with the required supply of yarn need to be furnished in a space-saving and time-saving manner, while the fleece width and the requisite weight per unit area can be adjusted by a simple regulation of the amount of compressed air in the blowing nozzle or nozzles in dependency upon the circumferential velocity of the rotating core or mandrel.

Many suitable variations can be made in the combination winding and air-laying apparatus of the invention so as to provide a wide variety of winding patterns, so long as the blowing nozzles accompany the means of distributing the bands of fiber-glass rovings at the desired lead or lag angle. Moreover, this small angle is preferably less than 90°, for example about 45° or less.

The blowing or jet nozzles are arranged adjustably with respect to their spacing between the exit end of the nozzle where the continuous filaments emerge and the depositing surface on the resin-coated surface of the winding core or its prewound surface. The nozzles are also preferably adjustable with respect to their inclination to this deposition surface which tends to occupy an axially parallel zone at any fixed point of time. Through the adjustment of the distance between the nozzle and the depositing surface, it is possible to closely adapt the width of the fleece or web to the width of the simultaneously applied roving band, in particular to overlap the fleece or web edges in a desired manner. Through the variation of the inclination of the nozzle to the depositing surface of the core member, there is additionally provided a simple means of adapting the apparatus to deffering core diameters.

Further, as another desirable feature of the invention, it is proposed that the nozzle 16 be situated in the entry angle between the winding surface and the roving guide element 12, i.e. the angle with its apex on the winding line 8'. It is also proposed that this nozzle be adjustable around the guide 12 in the case of the generation of a fleece layer for the formation of an outer resin-saturated surface structure, in such a manner that the roving guide element is then situated in the entry angle between winding core surface and blowing nozzle. In order not to impair the movement of the distributing means and also so as to secure the nozzles adjustably with respect to the fleece depositing surface of the continuous filaments and/or to the roving guide element, the air feed lines 18 to the nozzles 12 are flexible hoses or the like.

For those instances in which the process of the invention is to be used for producing containers, vessels or the like with a wound-on bottom or end piece, conventional filament winding machines are to be used with the known accessory distributing devices for the end construction, and on these devices there are likewise arranged one or more blowing nozzles in close proximity to the guide member for the roving band for the production of the air-laid fleece or web. It is also recommended that the armatures or valves in the air feed lines to the blowing nozzles, which in turn are fastened to the various distributing devices of the winding machine, be controllable in dependency upon the position of the reciprocal feed carriage or distributing slide member over limit switches. By coupling the limit switches, which are required for the usual sequence control of the winding machine and its different distributing devices, with the valves in the air lines to the respective blowing nozzles, it is possible for the blowing nozzles to be successively acted upon or engaged to the compressed air supply corresponding to the course of sequential movement of the distributing devices. Thus, any switching and nozzle activating means can be readily incorporated into the apparatus for the invention to achieve relatively complex winding patterns and sequential distributing functions.

One example is sufficient to show the advantages of the process of the invention. The object is to produce a liquid storage container with an inside diameter of 1600 mm. by the process of the invention, the winding core or mandrel being coated with resin and being turned at a rate of 12 r.p.m. on its longitudinal axis such that the peripheral velocity of the core lies at about 60 meters/minute, which is suitable for the application of the fiberglass roving bands. If there is available a band of several rovings of continuous glass filaments with a width of 100 mm., then there is wound per minute an area of six square meters. During the applying of the roving band, there is simultaneously produced a fleece or web of at least the same area as the inside surface of the container and, if desired, another fleece layer on the outside surface of the container. These fleece layers are formed by blowing a multifilament yarn by means of compressed air through a nozzle onto the resin surface. This compressed air is preferably free of oil and moisture, i.e. to achieve a very dry air stream. If the area weight of the desired nonwoven web is to be about 80 g/m$^2$, then there must be correspondingly generated a fleece at the rate of 480 g/min. With the use of a polyethylene terephthalate continuous filament yarn with a yarn size of dtex (10,000 meters of this yarn, according to definition, weighing 1100 grams), there results a velocity of the yarn of about 4360 m/min. with an adjustable cross-section of the blowing nozzle, there can be varied the required amount of air. If the available pressure of the compressed air is too low, then by simultaneously blowing of several yarns or bundles of filaments from one or more nozzles, the required amount of air can be reduced.

In contrast to the conventional container winding processes, the foregoing example permits a multilayer simultaneous winding and air-laying of the most appropriate and valuable filaments for the reinforcement of the final product. The container is not only quite strong but is also very resistant to chemical attack or decomposition from moisture or water. Moreover, practically no manual winding steps are needed and the overall time for producing a hollow structure is greatly reduced, especially in continuous winding operations.

The invention is hereby claimed as follows:

1. A method for producing a laminated hollow structure having at least one glass fiber reinforced resinous layer, which method comprises:

continuously rotating a winding core at a speed adapted to receive at least one glass fiber roving in winding engagement therewith; and simultaneously applying to the rotating core, at a small angle of displacement from each other on the circumference of the core, at least the following two layers in any sequence a. a random, non-woven, filamentary, water-resistant fleece which is continuously deposited by air-laying dry, continuous synthetic polyester filaments onto the core circumference containing a preapplied liquid thermosetting resin, and b. a band of at least one glass fiber roving impregnated with a liquid thermosetting resin which is deposited by continuously winding said band under tension onto said core circumference.

2. A method as claimed in claim 1 wherein layer (a) is composed of continuous polyethylene terephthalate filaments and layer (b) is composed of continuous fiberglass filaments.

3. A method as claimed in claim 1 wherein said thermosetting resin is selected from the class consisting of unsaturated polyester resins and epoxy resins.

4. A method as claimed in claim 1 wherein the air-laid fleece of layer (a) is deposited on a fresh resin surface of the winding core in a band width slightly greater than the fiberglass roving band of layer (b).

5. A method as claimed in claim 1 wherein layer (a) is applied as at least one of the inner and outer surfaces of said hollow structure and is composed of water-resistant linear polyester continuous filaments.

6. A method as claimed in claim 1 wherein at least one additional fleece layer composed of continuous fiberglass filaments is applied by air-laying the fiberglass filaments in the same manner as layer (a) but only between two roving layers (b).

7. A method as claimed in claim 1 wherein said continuous polyester filaments are supplied in untwisted form to a blowing nozzle for resolution into individual filaments and their continuous random deposition onto the rotating core to form the fleece layer (a).

8. A method as claimed in claim 1 wherein said liquid thermosetting resin is applied in a preliminary step followed by simultaneous application of layer (a) covered by layer (b).

* * * * *